US011847046B1

(12) United States Patent
Ayyadurai et al.

(10) Patent No.: US 11,847,046 B1
(45) Date of Patent: Dec. 19, 2023

(54) APPLICATION FUNCTIONALITY TESTING, RESILIENCY TESTING, CHAOS TESTING, AND PERFORMANCE TESTING IN A SINGLE PLATFORM

(71) Applicant: CITI CANADA TECHNOLOGY SERVICES ULC, Toronto (CA)

(72) Inventors: Ramkumar Ayyadurai, Princeton Junction, NJ (US); Vishal Row Mysore, Concord (CA); Chitrabhanu Das, Pune (IN); Sumit Sood, Pune (IN)

(73) Assignee: CITI CANADA TECHNOLOGY SERVICES ULC, Toronto (CA)

( * ) Notice: Subject to any disclaimer, the term of this patent is extended or adjusted under 35 U.S.C. 154(b) by 0 days.

(21) Appl. No.: 17/961,106

(22) Filed: Oct. 6, 2022

(51) Int. Cl.
*G06F 11/36* (2006.01)
(52) U.S. Cl.
CPC ...... *G06F 11/3688* (2013.01); *G06F 11/3684* (2013.01); *G06F 11/3692* (2013.01)
(58) Field of Classification Search
None
See application file for complete search history.

(56) References Cited

U.S. PATENT DOCUMENTS

| | | | | |
|---|---|---|---|---|
| 8,910,294 | B1 * | 12/2014 | Sennett | H04L 63/1433 726/25 |
| 11,113,175 | B1 * | 9/2021 | Adamo | G06F 40/216 |
| 11,301,350 | B1 * | 4/2022 | Byrne | G06F 11/263 |
| 2014/0337674 | A1 * | 11/2014 | Ivancic | H04L 41/342 714/43 |
| 2018/0239692 | A1 * | 8/2018 | Kalyanasundram | G06F 11/3672 |
| 2020/0341888 | A1 * | 10/2020 | Sridhar | G06F 11/3692 |
| 2021/0004310 | A1 * | 1/2021 | Srinivasan | G06F 8/65 |
| 2022/0206929 | A1 * | 6/2022 | Rao | G06F 11/3688 |
| 2022/0345568 | A1 * | 10/2022 | Gonzalez | H04M 3/242 |
| 2022/0398187 | A1 * | 12/2022 | Balasubramanian | G06F 11/3684 |

(Continued)

OTHER PUBLICATIONS

Anonymous, "Test centric analyzing system", 2010, IP.com (Year: 2010).*

(Continued)

*Primary Examiner* — Hossain M Morshed
(74) *Attorney, Agent, or Firm* — Johnson, Marcou, Isaacs & Nix, LLC; George Marcou; Scott A. Hendrix

(57) ABSTRACT

A network system to provide testing, resiliency, chaos and performance testing in a single tool that operates on cloud-based applications in real time. When applications are deployed on a cloud environment, the applications must be validated based on functional aspects, performance aspects, resiliency aspects, and test-code coverage ratio aspects. The system combines all these validations in a single package. The system provides a rich set of modules for functional validations, which can be combined as nodes to allow applications to be quickly validated for functionality. The extensible model of the same functional modules may also be used for performance testing. The system also provides resiliency and chaos testing mechanisms that push the applications into a constant state of perturbation. The system does so by detecting the application code and modifying the code at runtime to inject perturbation. The system monitors the recovery of the system from the testing.

18 Claims, 5 Drawing Sheets

(56) References Cited

U.S. PATENT DOCUMENTS

2023/0004445 A1* 1/2023 Bosch .................. G06F 21/562
2023/0037124 A1* 2/2023 Mengwasser ......... H04W 24/10

OTHER PUBLICATIONS

Borg, "Performance engineering: what is 'chaos testing' in application development?" 2021, OnPath (Year: 2021).*
De, "A Study on Chaos Engineering for improving Cloud Software Quality and Reliability", 2021, International Conference on Disruptive Technologies for Multi-Disciplinary Research and Applications (CENTCON-2021) (Year: 2021).*

* cited by examiner

APPLICATION FUNCTIONALITY TESTING, RESILIENCY TESTING, CHAOS TESTING, AND PERFORMANCE TESTING IN A SINGLE PLATFORM

FIELD OF THE INVENTION

The technology relates generally to the field of cloud-based application testing, and more particularly to methods and systems to provide a single holistic integrated platform for functionality testing, resiliency testing, chaos testing, and performance testing in the application's cloud infrastructure in plain English/Behavior Driven Development ("BDD) format, individually or in combination, along with integration capabilities to generate application code coverage against the above tests performed, real time results monitoring and live feeds to external monitoring systems.

BACKGROUND OF THE INVENTION

Businesses and other systems conventionally provide access to programs, applications, software, and other services to users, such as customers, merchants, operators, business partners, and other computing systems or people. Many of the applications to provide services to users are operated on a cloud computing system. The businesses may provide applications to conduct transactions, conduct social interactions, log events, access accounts, or perform any other types of interactions.

The cloud computing system may utilize containers stored on the cloud system to implement microservices of the application or perform other tasks. The containers, when operating together, allow a user to access the cloud computing system and operate the application as intended. For example, one container may host a microservice to allow a user to login to an application. Another container may host a microservice to allow a user to conduct an interaction with a database that stores the user's account. Another container may host a microservice to download data from the database. Any other types of microservices or other application design patterns may be provided by the cloud-based system to manage the application operations. Cloud applications with varied and different application architectures demand a unified and holistic testing platform which is architecture agnostic.

Cloud-based systems that utilize many containers or other types of nodes may be difficult to test because interactions between the multiple containers are difficult to predict. Performing tests that cause interruptions in the containers of active applications may create cascading failures that cause the entire system to collapse.

Business management applications and other related applications are becoming increasingly complex. These applications have a diverse technology stack, an extensive set of functionalities, and several overlapping features with regards to regulatory, compliance, and audit requirements. Large businesses require that these applications are not only functionally validated but also are sufficiently resilient to recover from any hardware, infrastructure, or capacity issues. Deploying the applications on cloud systems adds another level of complexity as any cloud deployment tends to add multiple points of failure. Complex applications also tend to have complex testing requirements. Conventional testing services are unable to fully test and validate complex applications that utilize multiple microservices deployed on a cloud system. Conventional testing services are unable to provide functionality testing, resiliency testing, chaos testing and performance testing in a single tool and neither the current tools have the capability to perform various combination of tests in a mix and match, scheduled or on demand style.

DETAILED DESCRIPTION

Example System Architecture

Figure 1:
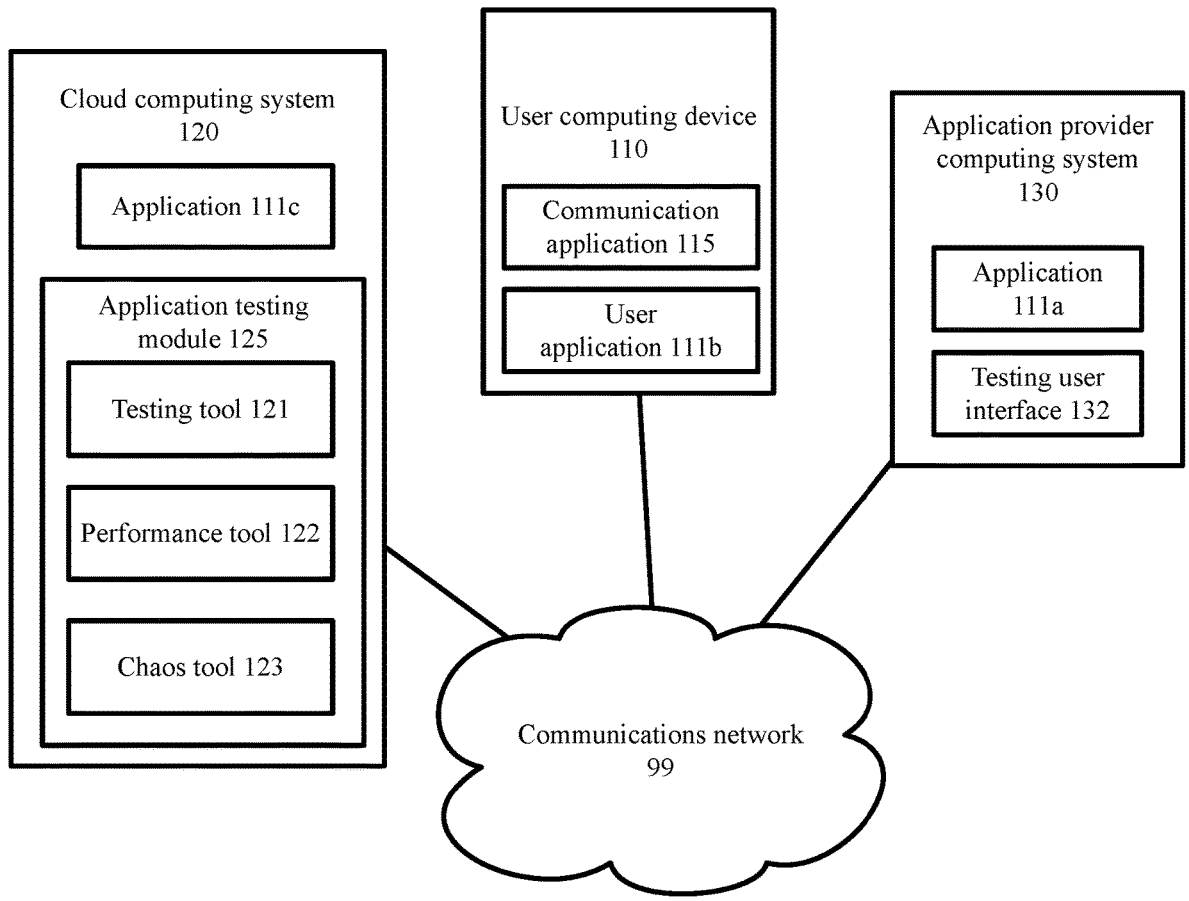
FIG. 1 is a block diagram depicting a system to perform cloud-based application testing.

FIG. 1 is a block diagram depicting a system to perform cloud-based application testing. As depicted in FIG. 1, the architecture 100 includes a user computing device 110, cloud computing system 120, and an application provider computing system 130 connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user that may communicate with a cloud computing system 120 to access services related to one or more applications that are operating on the cloud computing device 120. The cloud computing system 120 may be operated by a networking business, a third-party platform, an organization that provides cloud computing services to users, or any type of cloud computing system. The application provider operating the application provider computing system 130 may be a service provider that provides application services, transaction services, database services, or any other type of service that utilizes applications and data. While each server, system, and device shown in the architecture is represented by one instance of the server, system, or device, multiple instances of each can be used.

As shown in FIG. 1, the user computing device 110 includes a data storage unit (not shown) accessible by a communication application 115. The communication application 115 on the user computing device 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the cloud computing system 120 and an application provider computing system 130.

In the examples, the application 111 is developed on the application provider computing system 130, accessed by a downloaded version on the user computing device 110, and operated by on the cloud computing system 120. The application 111 may be stored and operated by the three devices for each of these purposes. The application 111 is represented on the three devices as application 111*a*, 111*b*, and 111*c*.

An instance of the user application 111*b* that is utilized by the user is located on the user computing device 110. An instance of the user application 111*a* may be located on the application provider computing system 130, such as when configuring, developing, or monitoring the application 111. An instance of the user application 111*c* may be located on the cloud computing system 120, such as when configuring, deploying, operating, or managing the application 111 with one or more containers or microservices. The application 111 may represent a single microservice or a group of microservices acting jointly to provide services to the user via the application 111.

The user computing device 110 includes the user application 111*b*. The user application 111*b* may be any type of software, hardware, application, program, webpage, or other type of application that is used by the user computing device 110 to provide a service via the application provider computing system 130. For example, the user application 111*b* may be an application that manages an account of a user with a system associated with the application provider computing system 130. The user application 111*b* may be provided by the application provider computing system 130 or the cloud computing system 120, such as by allowing the user computing device 110 to download the application 111*b*. The application provider computing system 130 may provide services to allow the user application 111*b* to access software or data from the cloud computing system 120. In another example, the user application 111*b* is not utilized by a human user of the user computing device 110 but is a background application that allows B2B interactions between the cloud computing system 120 and the user computing device 110 or others.

As shown in FIG. 1, the application provider computing system 130 includes a data storage unit (not shown) accessible by a testing user interface 132. The application provider computing system 130 may interact with web servers or other computing devices connected to the network 99, such as by managing interactions with the user computing device 110 and the cloud computing system 120. In certain examples, the application provider computing system 130 develops an application 111*a* to allow users to interact with a business, institution, or other entity. The application provider computing system 130 may be a function of the entity or third party that is contracted to develop the application 111*a*. The application 111*a* may allow a user to interact with the application provider computing system 130 or an entity associated with the application provider computing system 130.

As shown in FIG. 1, the cloud computing system 120 includes a testing tool 121, a performance tool 122, and a chaos tool 123 that are operating on an application testing module 125, and an application 111*c*. Each of these functions or devices may be encoded in hardware or software, may be functions of a device of the cloud computing system 120 such as a server, may be separate devices connected to other devices of the cloud computing system 120, or may be functions or algorithms operating on other devices of the cloud computing system 120. The cloud computing system 120 may represent a network of remote servers hosted on a network to store, manage, and process data, rather than a local server or a personal computer. The application testing module 125 may represent a tool, program, algorithm, or other function of the cloud computing system 120 that hosts and operates the tools 121, 122, 123.

The testing tool 121 represents a function, software, hardware, algorithm, or other type of process to perform testing on an application or microservice, such as the microservices provided by application 111*c*. For example, the testing tool 121 may verify that a microservice in a container on a cloud pod is operational, has sufficient processing capacity, interacts with other required microservices, and perform other functional tests as described herein. The performance tool 122 represents a function, software, hardware, algorithm, or other type of process to test the capacity and stability of an application or microservice as described herein. For example, the performance tool 122 may perform loading tests to determine the capacity that the microservice may tolerate before failure. The chaos tool 123 represents a function, software, hardware, algorithm, or other type of process to perform chaos testing on an application or microservice. For example, the chaos tool 123 may inject random or systematic errors and failures into the system to monitor the results as described herein. The tools 121, 122, 123 of the cloud computing system may operate or be managed as a single tool that performs the three functions on the cloud computing system 120.

Figure 5:
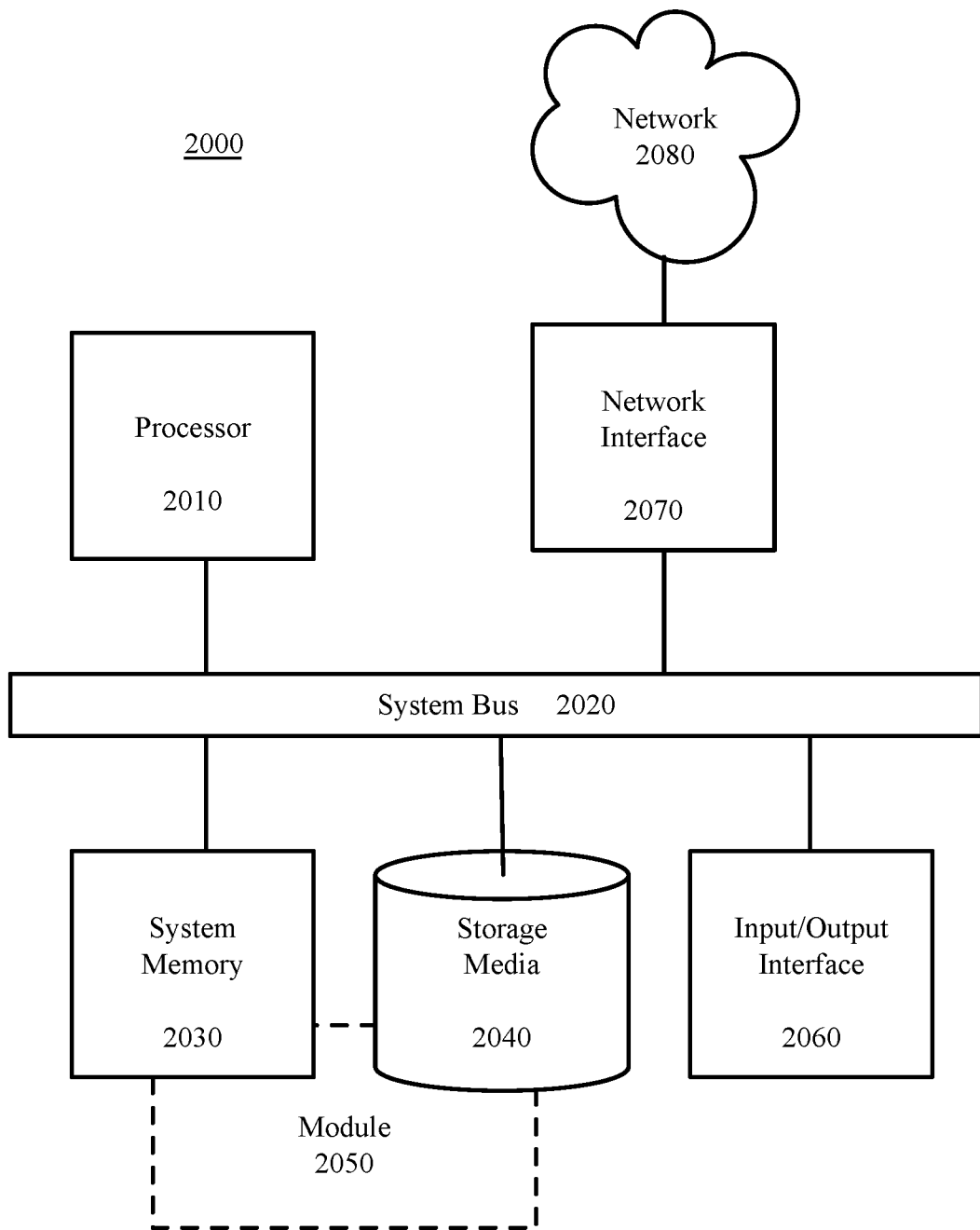
FIG. 5 depicts a computing machine and a module to provide mutable access tokens.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as network 99. The network 99 may include any type of data or communications network, including any of the network technology discussed with respect to FIG. 5.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to provide functionality testing, resiliency testing, chaos testing, and performance testing in a single tool that operates on cloud-based applications in real time. When applications are deployed on a cloud environment, the applications must be validated based on functional aspects, performance aspects, resiliency aspects, and test-code coverage ratio aspects. The system herein combines all these validations in a single package. The system provides a rich set of modules for functional validations, which can be combined as nodes in the system to allow applications to be quickly validated for functionality. The extensible model of the same functional modules may also be used for performance testing of the application. The system also provides resiliency and chaos testing mechanisms that push the applications into a constant state of perturbation. The system does so by detecting the application code and modifying the code at runtime to inject perturbation. In an example, the system operates as a Kubernetes operator. This operation environment would allow the application to be validated seamlessly because the operations could be performed in transparent way without adding delay to the time required to release the application.

The examples for embodiments of the invention may employ computer hardware and software, including, without limitation, one or more processors coupled to memory and non-transitory computer-readable storage media with one or more executable computer application programs stored thereon, which instruct the processors to perform such methods.

Figure 2:
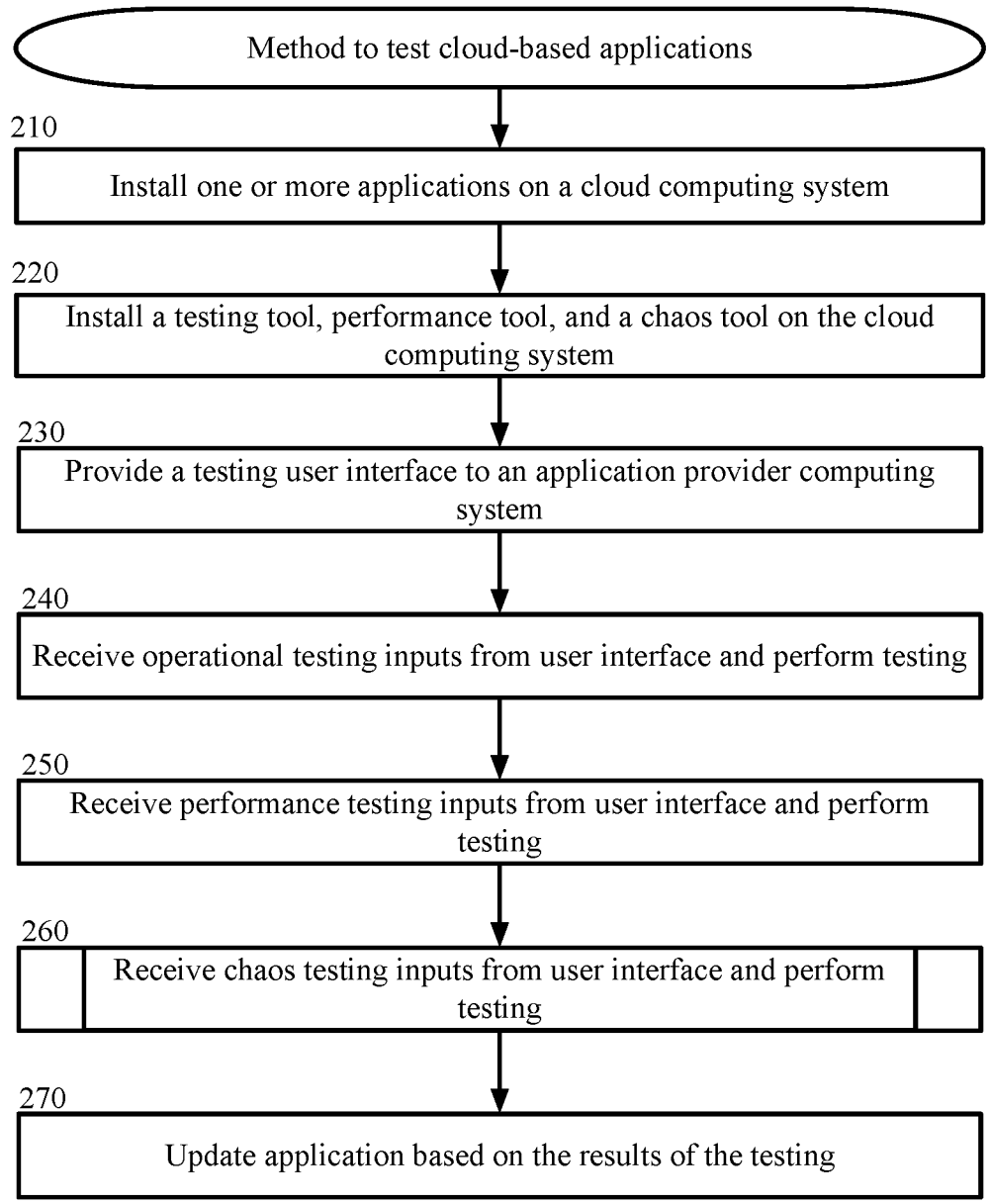
FIG. 2 is a block flow diagram depicting a method to perform cloud-based application testing.
Figure 3:
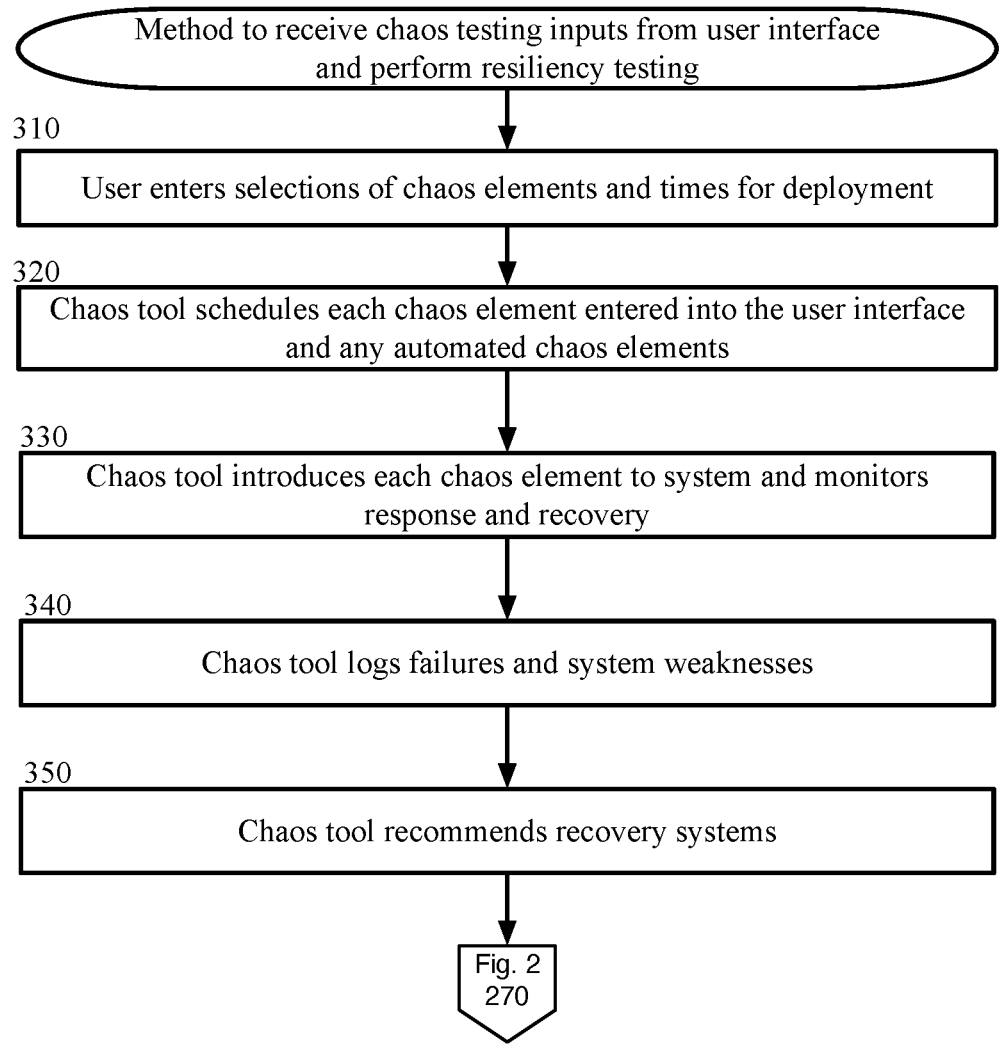
FIG. 3 is a block flow diagram of a method to receive chaos testing inputs from user interface and perform resiliency testing/chaos experiments.

The example methods illustrated in FIGS. 2-3 are described hereinafter with respect to the components of the example communications and processing architecture 100.

FIG. 2 is a block flow diagram depicting a method 200 to test cloud-based applications.

In block 210, one or more applications 111*c* are installed on a cloud computing system 120. In the examples, an instance of the user application 111*b* that is utilized by the user is located on the user computing device 110. An instance of the user application 111*a* may be located on the application provider computing system 130, such as when configuring, developing, or monitoring the application 111. An instance of the user application 111*c* may be located on the cloud computing system 130, such as when configuring, deploying, operating, or managing the application 111 with one or more containers or microservices. The application 111*c* may represent a single microservice or a group of microservices acting jointly to provide services to the user via the application 111.

In the example, microservices of the application 111*c* are uploaded into containers on the cloud computing system 120, such as a Kubernetes system. The application 111*a* may be developed by the application provider computing system 130 and communicated to the cloud computing system 120 for deployment. The cloud computing system 120 is configured to provide communications with user computing devices 110 that request access to services or data via applications 111*b* operating on the user computing device. The application provider computing system 130 or the cloud computing system 120 may determine the number and type of containers that are used to operate and manage the microservices of the application 111*c*.

The microservices may be any functions that, when used in conjunction with other microservices, combine to allow a user to operate an application 111*b* on a user computing device 110 to obtain services or data from a business or institution. For example, the application 111*b* may allow a user to conduct transactions with a banking institution. For example, one microservice may allow a user to sign in. Another microservice may allow a user to access a user account history. Another microservice may allow a user to conduct a transaction. Another microservice may allow the banking institution to monitor activities of the user on the application 111*b*. Any suitable number or types of microservices may be used.

In block 220, the cloud computing system 120 installs a testing tool 121, a performance tool 122, and a chaos tool 123 to use to test the application 111*c*. The tools 121, 122, 123 may be installed on an application testing module 125 of the cloud computing system 120 or via any other type of module, device, network, pod, container, or operation of the cloud computing system 120. The operations of each tool 121, 122, 123 will be discussed in the method herein. The tools 121, 122, 123 may be installed by an operator of the cloud computing system 120, by a third-party operator, by an operator of the application provider computing system 130, or by any suitable party. The tools 121, 122, 123 may be three functions of a single tool that is installed on the cloud computing system 120. That is, the tools 121, 122, 123 may be operated by a single program or software such as the application testing module 125, receive inputs from a single user interface, operate on a single container, or interact together in any suitable manner. The single application testing module 125 may schedule, manage, and operate the three tools 121, 122, 123 in conjunction with one another to prevent conflicts or resource depletion.

In block 230, the cloud computing system 120 provides a testing user interface 132 to the application provider computing system 130. The testing user interface 132 may be any suitable graphical user interface or other interface to allow an operator of the application provider computing system 130 to access the application testing module 125, configure the tools 121, 122, 123, monitor the testing, or perform any other suitable functions. The testing user interface 132 may be installed by an operator of the cloud computing system 120, by a third-party operator, by an operator of the application provider computing system 130, or by any suitable party.

In block 240, the cloud computing system 120 receives operational testing inputs from the user interface 132 and performs testing. An operator of the application provider computing system 130 enters settings or directions into the operator interface 132 to manage the testing and startup of the application 111*c*. For example, the operator selects from a menu of testing options to configure the tests to be run on the application 111*c*. The tests may include any combination of the testing processes described herein or other suitable testing processes.

In another example, the settings or directions are entered by a machine learning algorithm, and artificial intelligence, or other process, software, or program that determines what testing services should be provided.

When performing the testing inputs, the testing tool 121 is configured to validate the functionality of the microservices of the application 111c. The testing tool 121 operates each microservice separately to confirm that each microservice is configured properly to perform its function. The testing tool 121 may perform structural testing of each microservice. The testing tool 121 operates each microservice jointly with one or more other microservices to confirm that each microservice is configured properly to perform its function when the application 111c as a whole is operating. That is, a microservice may operate appropriately when testing alone, but may not perform appropriately when interacting with one or more other microservices. In an example, the testing tool 121 will simulate some or all of the functions of the microservices and monitor the results of the simulations to determine if expected and preferred outcomes are achieved. The testing tool 121 may operate the microservices under any suitable conditions to simulate real world applications.

In alternate embodiments, the testing tool 121 operates while the system is operational. The testing tool 121 monitors the performance of the microservices as the microservices are performing tasks for users. When functional or other errors are noted, the testing tool 121 logs the error and provides a notification of the error, such as by providing a notification on the user interface 132.

In block 250, the cloud computing system 120 receives performance testing inputs from the user interface 132 and performs testing. An operator of the application provider computing system 130 enters settings or directions into the testing operator interface 132 to manage the performance testing and startup of the application 111c. For example, the operator selects from a menu of performance testing options to configure the tests to be run on the application 111c. The performance tests may include any combination of the testing processes described herein or other suitable testing processes.

In another example, the settings or directions are entered by a machine learning algorithm, and artificial intelligence, or other process, software, or program that determines what performance testing services should be provided.

When conducting performance testing, the performance tool 122 determines the operational limits of the microservices or other functions of the application 111c. For example, the performance tool 122 may load one or more functions of a microservice until the microservice stops performing, such as due to a lack of processing capacity. The performance tool 122 may make repeated requests for a service faster than the microservice can perform the service. The microservice may have a failure or delay due to the backlog of requests. In another example, two or more microservices receive requests to interact with one another to perform a function. The requests require more processing capacity than the two or more microservices are capable of fulfilling. The two or more microservices may experience a delay or failure. Any other type of overloading of the system of the application 111c may be imposed to induce a failure.

When the performance tool 122 causes a failure, the performance tool 122 can log the limits of the application 111c. With the knowledge of the limits, an operator of the cloud computing system 120 or the application provider computing system 130 may limit future functions of the application 111c to prevent overloading or perform any other action based on the determined limits.

In block 260, the cloud computing system 120 receives chaos testing inputs from the user interface 132 and performs testing. An operator of the application provider computing system 130 enters settings or directions into the testing operator interface 132 to manage the chaos tool 123 and perform testing of the application 111c. For example, the operator selects from a menu of chaos testing options to configure the tests to be run on the application 111c. The chaos tests may include any combination of the testing processes described herein or other suitable testing processes.

In another example, the settings or directions are entered by a machine learning algorithm, and artificial intelligence, or other process, software, or program that determines what chaos testing services should be provided.

The method 260 of block 260 is described in greater detail with respect to FIG. 3. FIG. 3 is a block flow diagram of a method 260 to receive chaos testing inputs from user interface and perform resiliency and chaos testing.

In block 310, a user enters selections of chaos elements and times for deployment of the elements. The user accesses a graphical testing user interface 132 that is displayed on a device of the application provider computing system 130. The details of the testing user interface 132 are illustrated in greater detail with respect to FIG. 4.

Figure 4:
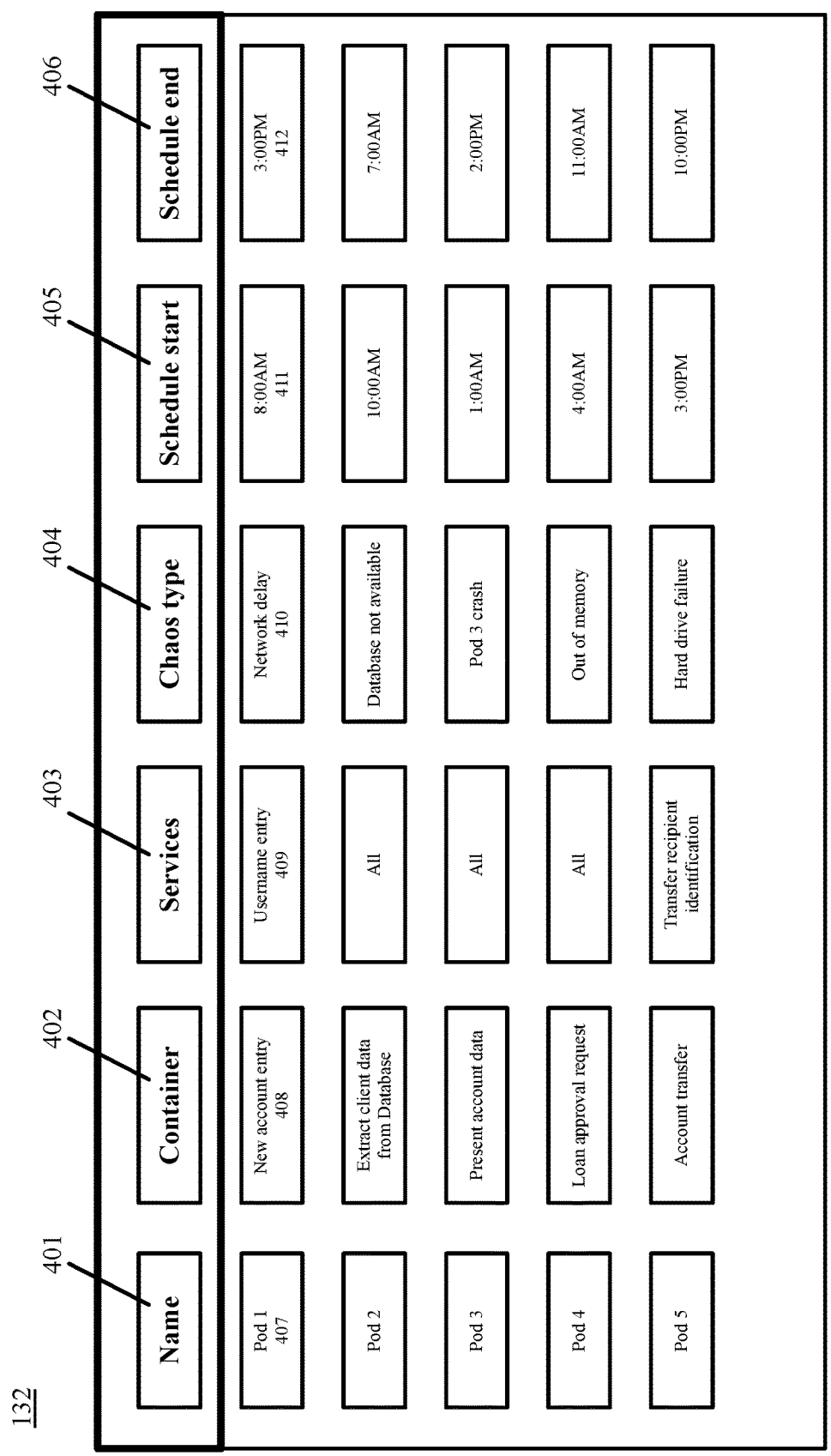
FIG. 4 is an illustration of an example testing graphical user interface.

FIG. 4 is an illustration of an example testing graphical user interface 132. The user interface 132 is illustrated with six entry categories: name 401, container 402, services 403, chaos type 404, schedule start 405, and schedule end 406. Each category is fillable by a user via a text entry, a pull-down menu selection, an autofill selection, or any other type of entry. Each entry row specifies a type of chaos to implement.

In an example, in the first row, an entry is configured for Pod 1 407. The name 401 of the pod is Pod 1. The pod is a module or element of the cloud computing system 120 that hosts one or more containers for microservices. The next entry specifies the container 402 in Pod 1 labeled "new account entry" 408. The next entry is the microservice 403 within the container that is being modified to provide chaos to the system. The microservice selected is username entry 409. The next entry is the chaos type 404 that is being introduced. In the example, the type of chaos is a "network delay" 410. The next entries are for the schedule start 405 and schedule end 406. The time entered for the schedule start 405 is 8:00 AM 411, and time entered for the schedule end 406 is 3:00 PM 412.

Based on the entries, starting at 8:00 AM and ending at 3:00 PM, the username entry microservice will not perform normally because of a real or simulated network delay causing the new account entry container to experience an upset condition. As illustrated, any other number of chaos elements may be scheduled to occur simultaneously, subsequently, or both.

In other examples, chaos simulations may introduce any suitable chaos types, such as database not available, Pod crashes, out of memory, hard drive failures, network failure, latency injector, toxy proxy, network outage, timeouts, packet loss, bytecode fault injection, filesystem failures (I/O delay, I/O error), container failures, CPU overload, RAM/Memory attack, middleware failures/latency (TIBCO, Kafka, Solace), queue buffer, slow consumer, file size, or fan out. Any other type of chaos may be introduced to the system to test the response. All these chaos types can be integrated seamlessly into the Dev/QA/UAT infrastructure and can be executed via an industry standard CI/CD pipeline.

Example Cloud Native Experiments may include items from Table 1.

TABLE 1

| EXPERIMENT | DETAIL |
| --- | --- |
| Byte code injection | Profile the application under test and randomly inject captured exceptions, segmentation faults and latency directly in the running application code |
| Kill running service(s) on the pod ungracefully | Kill a running service of the application ungracefully (akin to kill −9 or OOM kill) |
| Kill running pod/container | Evict an application's pod and container randomly |
| Spike system resources such as RAM, CPU | Hog the pod/container memory/CPU to 100% where the application is running |
| Loss of disk space | Cause full disk space in pod/container where the application is running |
| Node failure | Forcefully Evict the worker nodes of the cloud orchestration platform |
| Database failure and latency | Cause disconnects and latency to database from where the application communicates |
| Middleware disconnects and latency | Cause failures and latency to the supporting middleware of the application (such as Solace, Tibco) |
| Network disruption | Simulate loss of network, packet drops, corrupt packets, connection refusals, etc. |
| Scheduled chaos experiments | Simulate any of the above singularly or in combination at a scheduled time preferred by the user |
| Chaos Experiments and Machine Learning | Targeted chaos experiments on a swarm of cloud native microservices using ML techniques based on real world scenarios and based on weaknesses identified as part of modelling performance and functional tests |

Returning to FIG. 3, in block 320, the chaos tool 123 schedules each chaos element entered into the user interface 132 and any automated chaos elements. When the user enters the chaos elements into the user interface 132, the chaos tool 123 logs the requests and prepares the chaos element software, hardware, module, function, or other required elements to implement the chaos element.

Normal execution of application code can be captured via profiling and the captured code path can then be broken automatically by the tool. An example of computer code to break the normal execution of the application 111c to mimic the chaos scenario chosen may be performed by the tool by intercepting the "readFile" method and causing it to throw an IOException at entry.

Latency in the running application can be accomplished by adding a wait at entry or exit in the "readFile" method. An example is presented below:

```
public void readFile(String fileName) {
try (FileInputStream fis = new FileInputStream(new File(fileName))) {
  BufferedReader br = new BufferedReader(new InputStreamReader(fis));
  String line;
  while ((line = br.readLine( )) != null) {
    logger.log(Line);
    processFileData(Line);
  }
  Fis.close( );
} catch (IOException e) {
  handleException(e);
}
}
```

Another example triggers a segmentation fault at OS level or OutOfMemoryError in the running application by randomly allocating or freeing memory in the below code at runtime and monitor the performance of the application. These features can be achieved by the tool in an automated process by capturing/submitting exceptional behavior with minimal human intervention.

```
public void freeMemory(long address) {
```

-continued

```
  UNSAFE.freeMemory(address);
}
public long allocate(long size) {
  long address = UNSAFE.allocateMemory( l: size*BYTESIZE);
  if (address == 0) {
    throw new OutOfMemoryError( s: "Free native memory not
    available!");
  } else {
    return address;
  }
}
```

In block 330, the chaos tool 123 introduces each chaos element to the system and monitors the response and recovery of the system. When the time for each scheduled chaos element arrives, the chaos tool 123 injects the chaos into the system by initiating a software function, disabling software or hardware in the system, injecting code into a software element, forcing a setting to change, or performing any other suitable action to cause the requested chaos. Different chaos elements may happen to different microservices at the same time, overlapping in time, sequentially, or in any other suitable mix and match time selections.

The chaos tool 123 monitors the response of the affected microservices, the container, the pod, and the system as a whole. For example, the network delay 410 associated with the username entry 409 may cause one or more systems to fail. Users trying to access a new account entry may be unable to enter the required username. This failure may cause a cascading effect that causes other systems to fail. For example, if a user is unable to enter a username, then transactions that are scheduled may also fail. In another example, a microservice to which a chaos element is directed might not fail, but other microservices that interact with the affected microservice may fail because of changes in the operations of the affected microservice. For example, if an affected microservice is unable to access a database due to a chaos element interrupting the communication between the microservice and the database, the affected microservice may still operate normally, but other microservices that depend on the affected microservice to perform tasks associated with the database may fail.

In block 340, the chaos tool 123 logs failures and system weaknesses. The chaos tool 123 monitors the failures or other problems caused by the chaos. Each microservice, container, application 111c, or other system that fails or is adversely affected by the chaos element are logged by the chaos tool 123.

In the continuing example, the chaos tool 123 recognizes that the system does not fail due to the network delay 410. For example, the username entry 409 accesses the required data in another manner, such as from a different network. In this example, none of the systems fail due to the chaos.

The chaos tool 123 may recognize that the system is able to recover from the failure. Even if the system does temporarily fail, the microservice, or the system as a whole, is able to recover from the failure, such as by fencing off the failure from the rest of the application 111c, finding alternative mechanisms to perform required tasks, rebooting the failing microservice or device, or performing any other suitable tasks to recover from the failure.

When the schedule end 406 time is reached, the chaos tool 123 ends the scheduled chaos element. For example, the chaos tool 123 stops or deletes the injected software element that caused the chaos. The chaos tool 123 monitors the application 111c to determine if the application 111c is able to recover to normal operations when the chaos ends. The chaos tool 123 may log the actions taken by the application 111c during the chaos and after the chaos to determine the effectiveness of each action.

In an example, the logs of the events during the chaos scenario may be captured by the pod or by another microservice residing in the affected pod. The microservice may log the activities during the chaos scenario and communicate the activities to a user interface or other tool, such as the chaos tool 123, for review and inspection by a user or by a machine learning algorithm.

In block 350, the chaos tool 123 recommends recovery systems. When the chaos tool 123 identifies effective actions taken by the application 111c during and/or after the chaos, the chaos tool 123 logs the actions for future use. The chaos tool 123 may implement the effective action for use in other applications or systems. If actions taken were ineffective, the chaos tool 123 logs the ineffective actions for future use. The chaos tool 123 may implement different actions for use in the application 111c other applications or systems based on the ineffectiveness of the action.

In an example, if a machine learning algorithm is employed to build a model of the application 111 or other related systems, the results of the chaos scenario are entered into the input of the machine learning algorithm. The machine learning algorithm may use the model of the application to simulate actions to mitigate the chaos or recover from the chaos. As more data is input into the machine learning algorithm, the model become more predictive of responses to chaos inputs.

From block 350, the method 260 returns to block 270 of FIG. 2.

In block 270, the application 111 is updated based on the results of the testing. For example, an operator of the application provider computing system 130, the cloud computing system 120, or any other suitable system or operator may revise the application 111 based on the results of the three testing tools operated on the cloud computing system 120. The application 111a may be updated and uploaded to the cloud computing system 120 to update or replace the existing application 111c.

In certain examples, the testing of the application 111c described in FIG. 2-3 occurs while the application 111c is operating live. That is, users may be accessing the application 111a on user computing devices 110 and employing the application 111c to provide data or services while the testing is occurring. By performing the tests while operating live, the system is better able to identify problems because real world conditions are being processed simultaneously. In an alternate example, the testing of the application 111c described in FIG. 2-3 occurs while the application 111c is offline or not live. The testing may occur in a configuration environment or testing environment where users are not accessing the application 111c during the testing.

The combination of a testing tool 121, performance tool 122, and a chaos tool 123 as a single tool, application testing module 125, operating on the cloud computing system 120 combines all aspects of testing an application built on Kubernetes operator model and a user interface 132 to simulate the scenarios described herein making a combination tool capable of testing complex systems in the cloud environment. The novel Kubernetes operator combines functional and chaos scenario emulation in a single product with a rich user interface 132 built. The chaos tool 123 for implementing chaotic scenarios in complex trading applications is based on monolith/microservices architecture.

Many current applications or trading systems are hosted on Kubernetes or Openshift orchestrating platforms. Running chaos experiments via a separate user interface 132 requires a learning curve, navigating through deployment constraints within a business's internal infrastructure, and may not reside seamlessly within the ecosystem of trading applications.

The chaos tool 123 application user interface 132 features have been developed using the "Openshift Dynamic plugin" whereby the chaos tool 123 is created and deployed at run time in Openshift itself. This user interface 132 feature allows the user to interact with the application services residing in pods/containers directly in Openshift without having to navigate to, deploy or manage two different user interfaces. This eliminates the requirement of learning any new chaos tools as familiarity with Openshift translates into intuitiveness while using the chaos tool software. No special steps are needed to make the chaos engineering software compatible with the application under test.

As part of injecting chaotic scenarios, the system simulates certain conditions within the application being tested that may not be feasible via normal regression tests, such as exceptions, latencies, and other interruptions. Via the chaos engineering tool, a system may make the application behave in a certain way (such as making certain methods of a class perform an unexpected action) and then check the deviation from the steady state and observe the behavior of orders/trade within the trading application.

The chaos tool 132 performs the tasks described via "bytecode injection," without having the need to modify, recompile or restart the application under test. Once the experiment is completed, the injected bytecode can be easily removed and the application 111c returned to steady state for analysis. Development of the chaos engineering tool has been done using Openshift's operator pattern that allows complete automation of creation, configuration, and management of the cloud native chaos engineering software.

End users only need to focus on conducting chaos experiments within the Openshift cluster while the operator performs the injecting of byte code, process restarts, and other faults within the trading application. The system provides an ability to expose chaos experiments as Custom Resource Definitions (CRDS). The system provides an ability to integrate the Chaos Experiments CRD in CI/CD pipeline as part of software development lifecycle Shift Left.

The system provides an ability to schedule and orchestrate chaos across multiple applications deployed on same cluster. Operator Experimentations Environment configuration may be through fully configurable Kubernetes ConfigMaps and shared volumes. The system provides seamless integration with BDD/Cucumber/Gherkin to allow Chaos Experiments to be run throughout any phase of the Software Development Life Cycle.

In certain applications, a machine learning algorithm, artificial intelligence process, or other automated network system may operate the application testing module 125, the chaos tool 123, the testing user interface 132, or any other functions or devices of the system. For example, when tests are performed on the application 111 or any other applications, the results of the testing may be stored by a machine learning system and a model of the application may be created. The model may be used to predict how the application 111 would function under certain testing or operating conditions. The model may be updated and improved with additional testing data from the application 111 or any other applications. The model may recommend, based on the expected performance of the application 111, which chaos tests should be performed. For example, if the model has insufficient data for a newly installed microservice, the model may recommend chaos tests that are likely to affect the new microservice. The model may populate the user interface 132 with chaos testing parameters that are associated with the desired chaos testing for the new microservice. The machine learning system may update the model with the results of the new chaos tests.

Example Systems

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

A typical example to use the platform in a BDD/Plain English format is presented below. The example presents order and trade flow in a trading application comprising three layers—client connectivity layer, Algo layer and Exchange Connectivity layer. A normal functional test would comprise validating the order flow in a When/Then format and would be the base test covering a single end-to-end event for an order flow. The user can then add steps to describe failure points that may happen during the order/trade flow to depict resiliency and chaos events.

1 @FunctionalityTest #Run only order and trade message steps with chaos, resiliency and performance disabled
2 @ResiliencyTest #Kill configurable or random pods and nodes
3 @ChaosTest #Inject chaos, e.g database, network failure, bytecode injection, system resource spike
4 @PerformanceTest #configure test repeatability e.g run the test 1M times and inject chaos randomly after nth order
5 @CombinationTest #Configure all or any of the above to run
6 ⇒Feature: Check the order and trade flow message in a Front Office Trading Platform
7 ⇒Scenario: Check the order and trade flow message in a Front Office Trading Platform
8 #Test Simulation
9 When Client sends an order message to ClientConnectivity layer
10 #Run this step only when @ChaosTest is selected
11 When VeeRa inject OutOfMemoryError in Algo Layer for ChaosTest
12 #Test Validation
13 Then Client Connectivity layer receives the order message and sends to Algo layer
14 #Run this step only when @ResiliencyTest is selected
15 When VeeRa kill ExchangeConnectivity pod for ResiliencyTest
16 #Test Validation
17 Then Algo Layer receives the order message and sends ot ExchangeConnectivity layer
18 #Run this step only when @ChaosTest is selected
19 When VeeRa inject NetworkDisconnect in ExchangeConnectivity layer for ChaosTest
20 #Test Validation
21 Then ExchangeConnectivity layer receives the order message and sends to Exchange
22 #Test Simulation
23 When Exchange sends a trade message to the ExchangeConnectivity layer
24 #Test Validation
25 Then ExchangeConnectivity layer receives the trade and sends to Algo layer
26 #Run this step only when @ChaosTest is selected
27 When VeeRa inject latency in ClientConnectivity Layer and database failure in Algo Layer for ChaosTest
28 #Test Validations
29 When Algo layer receives the trade and sends to Client Connectivity layer
30 Then ClientConnectivity layer receives the trade and sends to Client Via the user interface in block 240, the test type can be chosen based on the Annotation used (shown with '@'). For example, if @FuntionalTest is used, the platform will run only the functional steps and disable all the resiliency/chaos steps. If @ResiliencyTest is used, then the platform would enable the step in line 15. Using @ChaosTest would enable lines 11, 19 and 27. Using @PerformanceTest would keep running the same test a configurable number of times. Using @Combination would enable the platform to run the tests in a combined way, such as by injecting chaos after 1M orders have been entered as part of @Perfomance.

Via the blocks 250, 260 and 270, testing results based on the tests run as part of this alternate example of block 240 can be obtained.

Example Systems

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to test cloud-based applications, comprising:
a storage device in a cloud-based computing network; and
a processor in the cloud-based computing network communicatively coupled to the storage device, wherein the processor executes application code instructions that are stored in the storage device to cause the system to:
install an application to provide services to one or more users;
install a single tool on the processor that performs functional testing, load testing, and randomized chaos testing on the installed application;
perform, using the single tool, functional testing and load testing on the installed application;
receive, on a graphical user interface from a computing device of an application provider, inputs specifying a plurality of two or more microservices that together make up the installed application from a plurality of layers of the installed application, a combination of tests to be performed randomly to the plurality of the two or more microservices, a type of chaos to be implemented to the plurality of the two or more microservices, and a time for the each of the chaos types to be implemented; and
perform, using the single tool, chaos testing based on the received inputs.

2. The system of claim 1, wherein the functional testing, the chaos testing, and the load testing are configurable in a machine-readable behavioral driven development ("BDD") format by an operator that specifies events that trigger each of the tests, an order for the tests, and combination of the tests to be run.

3. The system of claim 1, further comprising test code instructions to cause the system to analyze the functional testing, load testing, and chaos testing to assess a level of code coverage of the application.

4. The system of claim 1, further comprising application code instructions to:
perform machine learning techniques to gather data for steady state analysis, without a need for human interaction; and
utilize the machine learning techniques to predict results of simulated chaos testing in the application based on results of the chaos testing, the load testing, and the functional tests.

5. The system of claim 1, further comprising application code instructions to cause the system to:
log results from the functional testing, the load testing, and the chaos testing; and
communicate the results to the computing device of the application provider.

6. The system of claim 5, further comprising application code instructions to cause the system to:
update the application based on the logged results, the update being configured to correct weaknesses identified in the results; and
repeat the performance of the functional testing, the load testing, and the chaos testing on the updated application.

7. The system of claim 1, wherein two or more microservices are affected by different types of chaos simultaneously.

8. The system of claim 1, wherein the inputs to the graphical user interface are provided by an operator of the computing device of the application provider.

9. The system of claim 1, wherein the inputs to the graphical user interface are provided by a machine learning algorithm of the computing device of the application provider.

10. The system of claim 1, wherein the graphical user interface receives inputs specifying parameters of the functional testing and load testing.

11. The system of claim 1, further comprising application code instructions to shuffle and schedule the functional testing, load testing, and chaos testing based on inputs received on the graphical user interface.

12. The system of claim 1, wherein the functional testing, the load testing, and the chaos testing are performed simultaneously.

13. The system of claim 1, wherein the functional testing, the load testing, and the chaos testing are performed while the application is expected to be experiencing a higher than typical load.

14. The system of claim 1, further comprising test code instructions to cause the system to log the recovery of the application after the chaos testing.

15. The system of claim 14, further comprising test code instructions to cause the system to log systems that do not recover after the chaos testing.

16. The system of claim 15, further comprising test code instructions to cause the system to recommend updates to the application based on identified systems that do not recover after the chaos testing.

17. A method to test cloud-based applications, comprising:
installing an application to provide services to one or more users;
installing a single tool on the processor that performs functional testing, load testing, and randomized chaos testing on the installed application;

performing, using the single tool, functional testing and load testing on the application;

receiving, on a graphical user interface from a computing device of an application provider, inputs specifying a plurality of two or more microservices that together make up the installed application from a plurality of layers of the installed application, a combination of tests to be performed randomly to the plurality of the two or more microservices, a type of chaos to be implemented to the plurality of the two or more microservices, and a time for the each of the chaos types to be implemented; and performing, using the single tool, chaos testing based on the received inputs.

18. A computer program product, comprising:

a non-transitory computer-readable medium having computer-readable program instructions embodied thereon, the computer-readable program instructions comprising computer-readable program instructions to:

install a single tool on the processor that performs functional testing, load testing, and randomized chaos testing on an installed application;

perform, using the single tool, functional testing and load testing on the application;

receive, on a graphical user interface from a computing device of an application provider, inputs specifying a plurality of two or more microservices that together make up the installed application from a plurality of layers of the installed application, a combination of tests to be performed randomly to the plurality of the two or more microservices, a type of chaos to be implemented to the plurality of the two or more microservices, and a time for the each of the chaos types to be implemented; and perform, using the single tool, chaos testing based on the received inputs.

* * * * *